Figure 14:
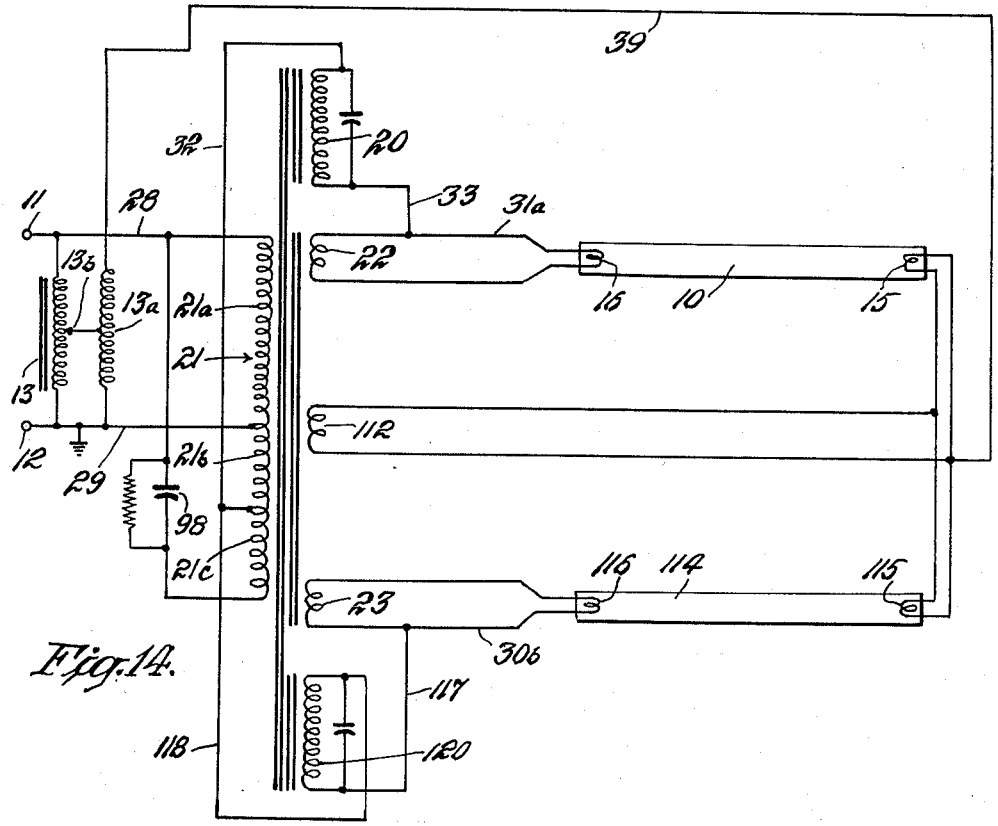

March 29, 1960 A. L. BASTIAN 2,930,998
FLUORESCENT LAMP DIMMING BALLAST
Filed Feb. 9, 1956 4 Sheets-Sheet 1
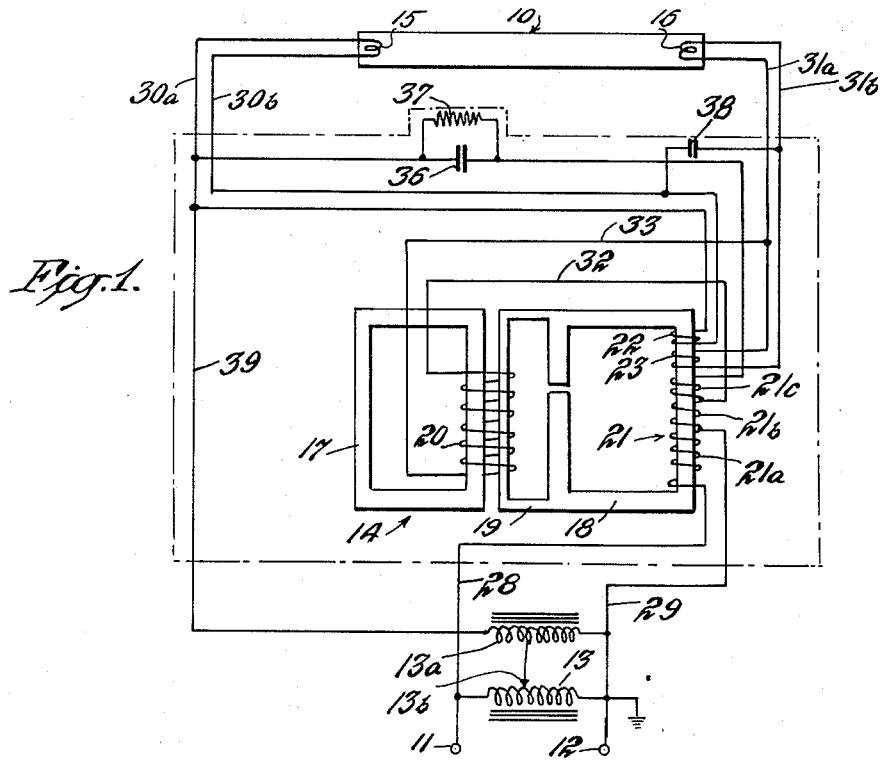
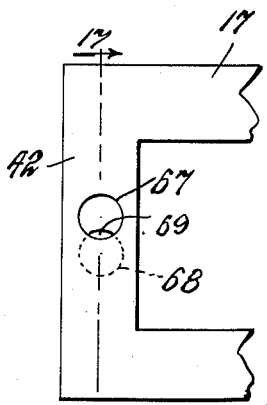 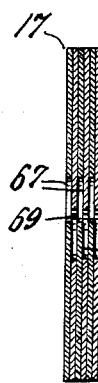 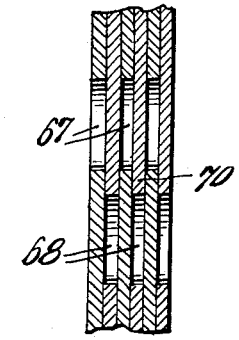 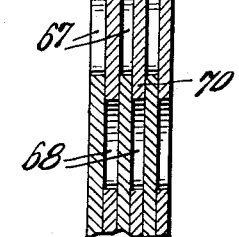
Fig.16. Fig.17. Fig.18. Fig.19.
INVENTOR.
ARTHUR L. BASTIAN
BY
Frank A. Bower
ATTORNEY March 29, 1960     A. L. BASTIAN     2,930,998
FLUORESCENT LAMP DIMMING BALLAST
Filed Feb. 9, 1956     4 Sheets-Sheet 2
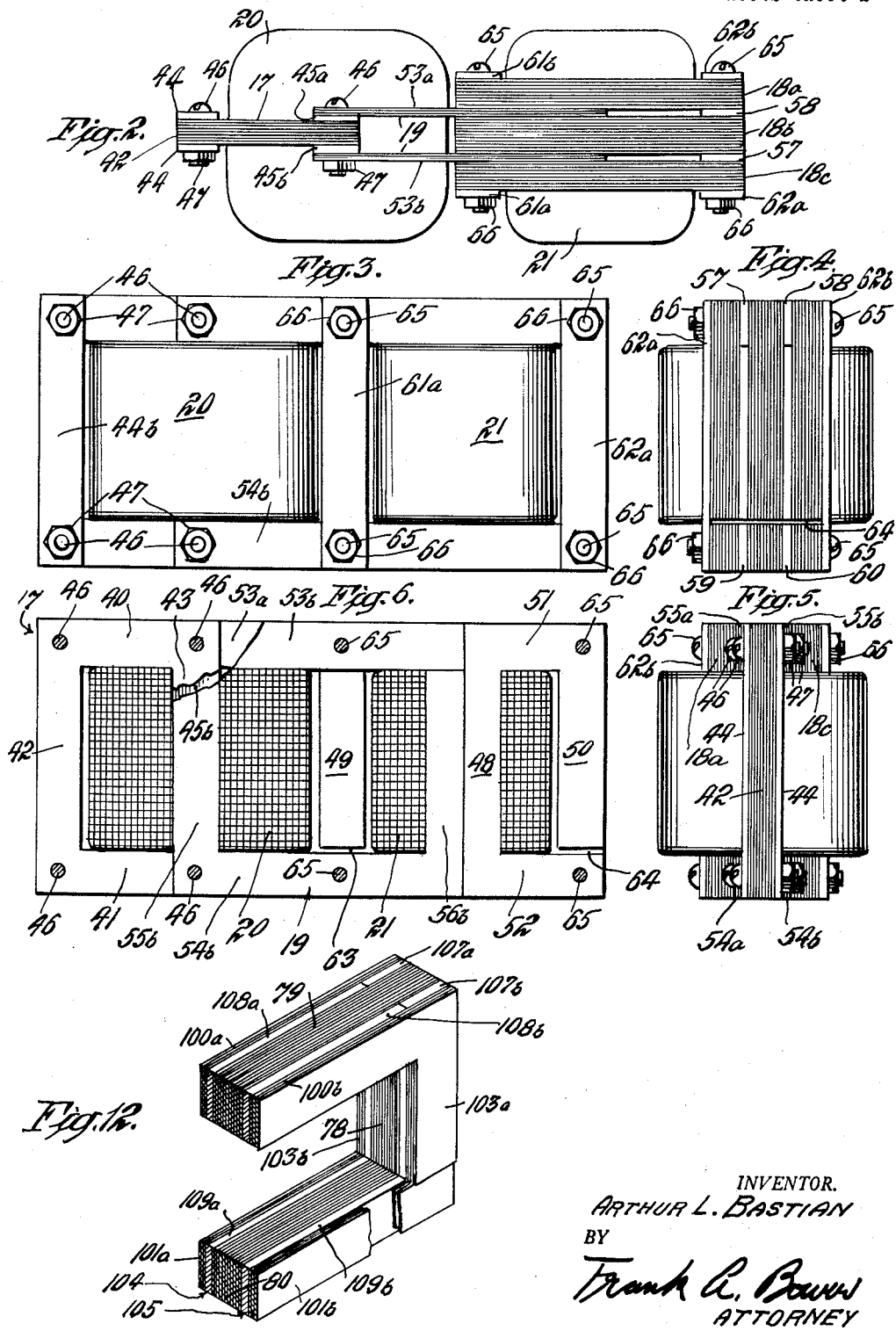
INVENTOR.
ARTHUR L. BASTIAN
BY
Frank A. Bauer
ATTORNEY March 29, 1960 A. L. BASTIAN 2,930,998
FLUORESCENT LAMP DIMMING BALLAST
Filed Feb. 9, 1956 4 Sheets-Sheet 3
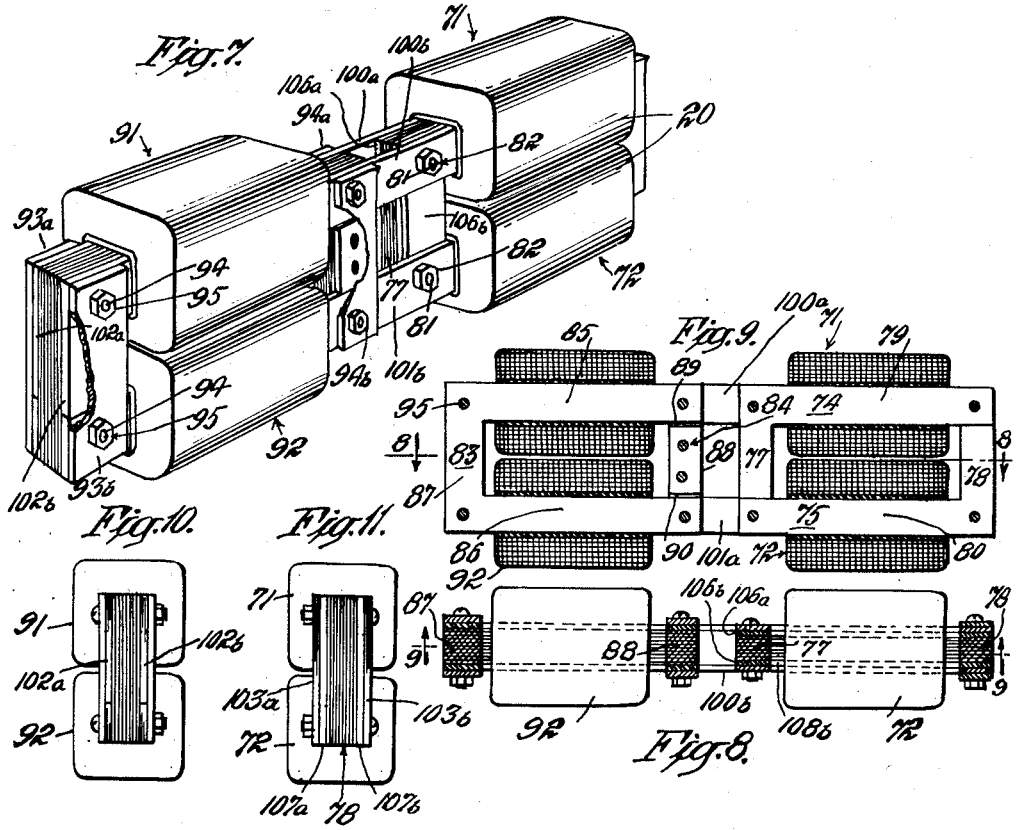
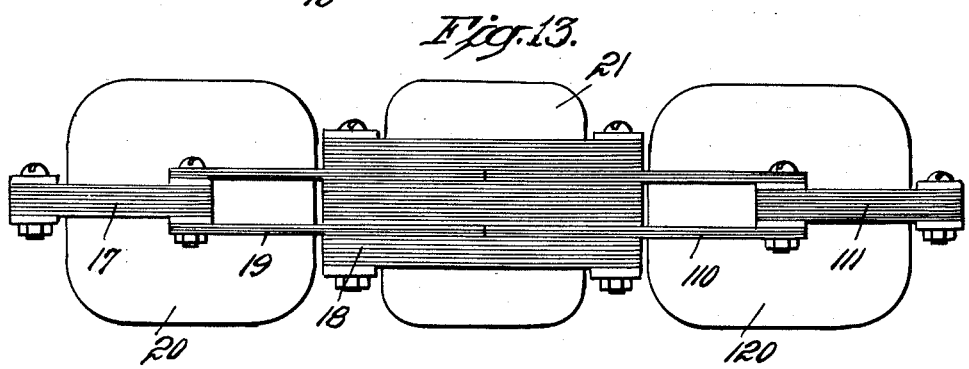
INVENTOR.
ARTHUR L. BASTIAN
BY
Frank C. Bower
ATTORNEY March 29, 1960

A. L. BASTIAN 2,930,998

FLUORESCENT LAMP DIMMING BALLAST

Filed Feb. 9, 1956

4 Sheets-Sheet 4

INVENTOR.
ARTHUR L. BASTIAN
BY
Frank A. Bauer
ATTORNEY

United States Patent Office 2,930,998
Patented Mar. 29, 1960

1

2,930,998

FLUORESCENT LAMP DIMMING BALLAST

Arthur L. Bastian, Yonkers, N.Y., assignor to Ward Leonard Electric Co., Mount Vernon, N.Y., a corporation of New York Application February 9, 1956, Serial No. 564,501

6 Claims. (Cl. 336—165)

This invention relates to apparatus for dimming fluorescent lamps and is directed particularly to the ballasts controlling the currents to the lamps and the circuits in connection thereto.

This application is a continuation-in-part of my copending application Serial No. 435,170, filed on June 8, 1954, and entitled "Apparatuses and Circuits for Dimming Gaseous Discharge Devices," issued as Patent No. 2,821,661 on January 28, 1958.

One type of fluorescent lamp comprises a sealed cylindrical glass envelope with a fluorescent or phosphor coating, such as a zinc beryllium silicate and magnesium tungstate mixture, on the inner surface of the envelope. The coating radiates light in a visible spectrum on energization by the radiation from the ionized gas contained within the sealed envelope. The gas may comprise a rare gas, such as argon, at a pressure of about 3.5 mm. of mercury, and a small quantity of mercury at a low pressure of the order of 6 to 10 microns of mercury. Filaments or electrodes are positioned inside of and at the respective ends of the glass envelope and may be of the oxide coated type, preferably in the form of coiled tungsten wire activated with alkaline earth metal oxides. In the case of a 48-inch fluorescent lamp, the application of a voltage in the order of 250 to 400 volts across the electrodes ionizes the gases and a current is conducted between the electrodes energizing the gas and causing it to radiate. The radiation of the gas in turn excites the fluorescent coating which radiates visible light. As an example of a given lamp when it is conducting, the voltage across the lamp has a range of 90 to 110 volts and the current through the lamp has a range from .0005 to .5 ampere. The 90 to 110 volts is sufficient to maintain the gas in an ionized state even though the voltage may be alternating at a rate of sixty cycles a second. However, the gas will not remain ionized if the voltage drops substantially below this value without additional means to sustain the ionization.

Various means have been provided to maintain the ionization of the gas at lower voltages and to permit the starting of the lamp when the lamp voltages are set at low intensity of illumination.

An object of the invention is to provide a ballast that permits the variation of the intensity of illumination of fluorescent lamps over a wide range.

Another object of the invention is to provide a ballast with means for initiating and maintaining the ionization of the gas of a fluorescent lamp over a wide range of illumination intensity.

Another object of the invention is to provide a ballast that maintains the arc over a range of illumination and is compact for mounting on standard fluorescent lighting fixtures.

Other and further objects and advantages will be apparent from the following description taken in connection with the drawing in which:

Fig. 1 is a dimming circuit with the ballast schematically illustrated;

2

Figure 15:
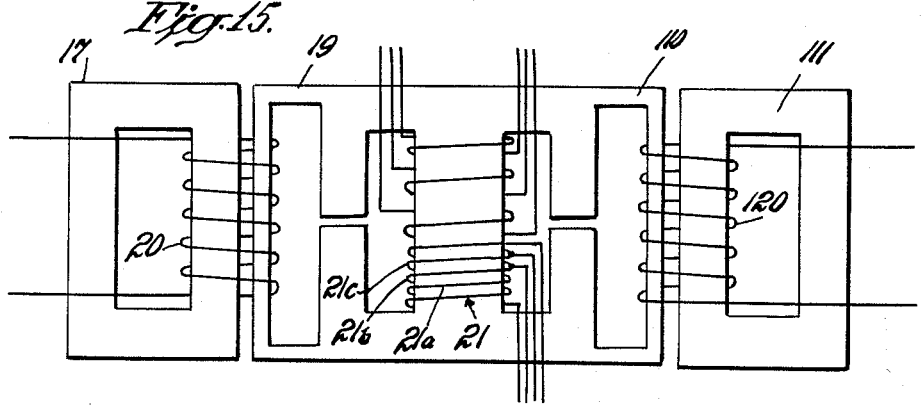

Fig. 2 is a top view of the ballast;
Fig. 3 is a side view of the ballast;
Figs. 4 and 5 are opposite-end views of the ballast;
Fig. 6 is a sectional view of the ballast taken along line 6—6 of Fig. 2;
Fig. 7 is a perspective view of another embodiment of the ballast;
Fig. 8 is a top view of the ballast in Fig. 7;
Fig. 9 is a sectional view taken along lines 9—9 of Fig. 8;
Figs. 10 and 11 are opposite-end views of the ballast in Fig. 7;
Fig. 12 is a perspective fragmentary view of the reactor portion of the core;
Fig. 13 is a top view of the two-lamp ballast;
Fig. 14 is a circuit diagram of the two-lamp ballast;
Fig. 15 is a schematic illustration of the two-lamp ballast of Fig. 13;
Fig. 16 is a fragmentary side view of the reactor core of Fig. 1;
Fig. 17 is a sectional view taken along lines 16—16 of Fig. 16;
Fig. 18 is an enlarged sectional view of Fig. 17; and
Fig. 19 is a fragmentary sectional view of another embodiment of the reactor core of Fig. 1.

The fluorescent lamp 10 has heated cathodes 15 and 16 and is supplied with alternating current and voltage from the terminals 11 and 12 through the autotransformer 13, booster transformer 13a and ballast 14. The terminals 11 and 12 are adapted to be connected to a single phase 120-volt alternating supply. The ballast 14 has a main winding 21, a ballast or reactor winding 20 and filament windings 22, 23.

The main winding 21 and filament windings 22, 23 are wound on the transformer core 18 and the reactor winding 20 is wound on the reactor core 17. A peaking core 19 passes through the main winding and reactor winding to couple the reactor winding and main circuit.

The main winding 21 has a main portion 21a, a booster portion 21b and portion 21c for power factor correction. The portion 21a is connected across the terminals 11, 12 by lines 28, 29 to impress the supplied voltage thereacross. The current through the portion 21a provides a flux passing through the transformer core and the peaking core. The booster portion 21b is preferably an extension of winding 21a and is coupled with the flux supplied by portion 21a to produce a voltage. The cathodes 15 and 16 are connected to filament windings 22, 23, respectively, which are wound to create a voltage corresponding to the filament voltage required by the cathodes 15, 16. The cathode 15 is connected to winding 22 by lines 30a, 30b and the cathode 16 is connected by lines 31a, 31b to filament winding 23. The reactor ballast winding 20 is connected between the lamp 10 and the winding 21. The line 32 connects the winding 20 in series with the portion 21b, and the line 33 is connected to filament lead 31a to connect the reactor winding 20 in series with the lamp 10. The cathode 15 is connected to the booster transformer 13a by filament lead 30a and line 39. Thus the line 39, lead 30a, lamp 10, lead 31a, line 33, winding 20, line 32 are connected in series across the booster transformer 13a and the winding portion 21b.

The autotransformer 13 is connected across the terminals 11, 12 and has a contact 13b for tapping voltages therefrom. The terminal 12 in this preferred connection is connected to ground or neutral. The voltage across the winding 13a is determined by the contact 13b. The contact 13b is connected to an intermediate portion of winding 13a so that the voltage across the booster transformer is higher than the supply voltage. The voltage impressed across the lamp 10 and winding 20 is the voltage across the booster transformer 13a and the portion 21b of the winding 21. Since the booster winding 21b has an unvariable voltage and transformer 13a a variable voltage, the voltage across the lamp 10 and reactor winding 20 may be varied through a range with a minimum voltage corresponding to the voltage of the winding 21b to a maximum voltage equal to the sum of the voltage of winding 21b and the booster transformer 13a by movement of the contact 13b across the transformer 13.

In the preferred embodiment with conventional fluorescent lamps, the winding portion 21b preferably has a voltage of 85 volts and the booster transformer 13a preferably has a range of voltages 0–145 volts when the supply voltage is 120 volts. Thus voltage across the lamp 10 and winding 20 may be varied over a range from 85 volts to 230 volts.

The lamp 10 is fired or ionized by producing a peaking voltage in the reactor winding 20. This peaking voltage is preferably of a short duration and has a high enough value to ionize the lamp. The peaking voltage is produced by coupling the reactor winding 20 and transformer winding 21 by the peaking core 19 having a low flux capacity. In the preferred embodiment of the ballast, the peaking voltage is of the order of 170 volts and is produced in a time relation with the maximum voltage across the reactor winding 20. Thus the peaking voltage is added to the applied voltage so that the starting voltage between the cathodes are between 255 to 400 volts.

The core of the ballast 14 comprises a reactor core 17, a transformer core 18 and a peaking core 19. Referring to Figs. 2 through 6, a detailed illustration of the preferred embodiment of the ballast 14 is shown. The reactor core 17 is preferably made of U- and I-shaped silicon steel laminations interleaved to provide a continuous steel magnetic path for the flux of the winding 20. The reactor core is of a rectangular type and has end legs 40 and 41 and side legs 42 and 43. The winding 20 is formed with a central bore. The laminations are stacked and inserted in the bore in a conventional manner. The laminations are securely held together in tight magnetic contact by means of the nonmagnetic straps 44, 45 and the nonmagnetic clamping means which may comprise bolts 46 and nuts 47. The straps 44 are mounted on opposite sides of the side leg 42 and the straps 45 are mounted on opposite sides of legs 43 and extend through the bore of the winding 20. The bolts 46 preferably pass through the corners of the core at the juncture of the prospective legs.

The transformer core is formed of stacked E-shaped laminations and stacked I laminations, both of silicon steel, to form a center leg 48 and legs 49 and 50 and side legs 51 and 52. The main winding 21 is formed with a center bore and the E-shaped laminations are stacked and the center leg 48 is inserted in the bore. The center leg 48 has a cross-sectional area approximately equal to the combined cross-section area 49 and 50. One magnetic path is provided through the end leg 49 and the other magnetic path is provided through the end leg 50. The end legs are preferably of the same length. The center leg 48 is slightly longer than the two end legs 49, 50 so that the I member is in abutting relation with the center leg and is spaced from the ends of the end legs to form nonmagnetic gaps in both paths. The gaps may be air gaps or filled with a nonmagnetic and nonconductive material.

The peaking core comprises interleaved U- and I-shaped laminations formed in two paths to provide greater rigidity to the core structure. The peaking core has interconnecting legs 53a and 53b and 54a and 54b on the opposite sides of the windings from the legs 53a and 53b. The interconnecting legs are coupled at each end by end legs 55a and 55b, 56a and 56b, respectively. The legs 55a and 55b pass through the central bore of the winding 20 and are spaced from the reactor core 17 by the nonmagnetic straps 45a and 45b and are securely clamped to the reactor core by means of the bolts 46 and nuts 47. The legs 56a and 56b extend through the core of the winding 21 in magnetic contact with the core 18. The peaking core 19 comprises a few laminations and has a cross-section substantially less than the transformer core or reactor core and forms a path for magnetic flux linking through the reactor winding 20 and the main winding 21. The small cross section of the peaking core limits the flux carried by the peaking core to a low amount.

The transformer core 18 has a greater number of laminations than the reactor core 17 and the laminations of the peaking core are fitted between sections 18a, 18b and 18c of the transformer croe. Since the peaking core overlaps with only a portion of the transformer core, nonmagnetic inserts 57, 58, 59 and 60 are stacked in the transformer core to space sections and hold the laminations in tight contact. The transformer core is securely held together by clamping means at the corners of the core. The clamping means may comprise the nonmagnetic straps 61a, 61b and 62a, 62b extending contiguous with the end legs 49, 50, respectively, of the transformer core and bolts 65 extending through the corners of the core and nuts 66 threaded thereon to securely hold the laminations in tight magnetic contact.

The transformer core 18 has a high flux capacity. The air or nonmagnetic gaps 63, 64 between the end legs and the I laminations are provided to increase the reluctance of the magnetic paths through the center leg 48, the side legs 51, 52 and the end legs 49, 50 of the transformer core. With this increased reluctance, the initial magnetic flux created by the transformer core will pass through the low flux capacity peaking core 19, magnetically coupling the reactor winding 20 and the main winding 21. This induces a voltage in the reactor winding. Since, however, the peaking core 19 has a small cross section and a low flux capacity, it becomes saturated by a relatively low amount of flux from the main winding. The remaining magnetic flux created by the main winding 21 passes through the end legs 49 and 50 of the transformer core. The flux in the peaking core 19 during the remaining portion of the flux cycle remains substantially constant and the peaking voltage induced in the reactor winding 20 therefore drops to a negligible value. The reactor winding 20 has a greater number of turns than the main winding 21 so that the peak voltage produced in the reactor winding 20 will have a high value.

In the preferred embodiment the phase relation of the voltage impressed across the reactor winding 20 by the autotransformer 13 and the peak voltage induced by the main winding 21 is such that the peak voltage occurs at the maximum of the voltage impressed across the reactor winding 20. This relation is attained since the voltages impressed across the main winding 21 and the reactor winding 20 are substantially in phase and the current through the main winding is approximately 90 degrees out of phase in view of the inductance of the transformer winding. Therefore the flux in the peaking core 19 is changing at its greatest rate when the voltage in the reactor winding is at its highest value. It is of course understood that components may be placed in the circuit to vary the phase relationships of the currents and voltages so that the peak voltage may occur at other portions of the voltage cycle across the reactor other than at the maximum voltage.

It is preferable that the peak voltage has a very short duration so that the R.M.S. value of the reactor winding voltage is not substantially increased. It is also preferable that the peak voltage increase rapidly. The value of the peak voltage does not change with the variation of the reactor winding voltage as the lamp is changed in intensity of illumination. The voltage across the reactor winding and lamp is adjustable approximately between 85 to 230 volts maximum. Thus, at the high intensity setting, a maximum peak voltage of 400 volts is created across the lamp, and starting at the lowest intensity of illumination of dimout, the voltage across the lamp is 255 volts. This is sufficient voltage to ionize the gas in the fluorescent lamps. Thus the lamp may be started either at the dim end or the bright end of the illumination intensity range. The peak voltage is attenuated when the lamp is conducting, particularly at the bright voltages.

With the variation of the voltage across the series combination of the reactor winding 20 and the lamp 10 over a range of 85 to 230 volts, the arc current passing through the lamp and reactor winding 20 also changes. A large current passes through the lamp at full brightness, and a small current passes through at dimout. It is desirable to have a substantial change in flux density for each increment of change in arc current. It is preferable that the reactor core saturate slowly rather than abruptly as in the case of the peaking core. The reactor core 17 may be modified by providing apertures 67 and 68 in the laminations to reduce the cross-sectional area of the core over a given portion of the magnetic path.

In the fragmentary views Figs. 16 through 19 fragments of the laminations of the reactor core are shown with apertures 67 and 68. As best illustrated in Fig. 17, the apertures 67 are offset from the apertures 68 of adjacent intermediate laminations. The row of spaces formed by the apertures 67 are offset from the row of spaces formed by the apertures 68. The two rows preferably slightly overlap so that a continuous opening 69 is formed through the reactor core. The apertures 67 and 68 are preferably formed in the side leg 42. However, the apertures 67 and 68 may be spaced so that a continuous portion 70 may be provided between the two rows.

This arrangement of the nonmagnetic apertures and the iron or silicon steel contiguous therewith tends to saturate in one portion of the core, leaving another portion free to increase in flux density. Referring more specifically to the enlarged view of Fig. 18 and Fig. 19, the laminations are shown. The core above and below the rows remains unsaturated, while the portions of the laminations between and around the apertures become saturated over a wide range of the flux density in the portion of the core above the apertures. The flux, on passing through the portion of the core containing the apertures, will pass through the iron adjacent to the apertures. As the flux density is increased, the laminations become saturated between the edge of the apertures and the edge of the laminations. The flux then will pass through the adjacent lamination containing the other apertures. Thus the reactor core slowly saturates and the flux density does not change abruptly with increase in voltage across the reactor winding.

Instead of apertures 67 and 68, the cross section of the leg 42 may be reduced by notches in the edge of the laminations which may be similarly offset as the apertures 67 and 68. These notches and the apertures 67 and 68 provide a contouring of the core of the reactor portion which accomplishes a more gradual saturation of the core.

A winding 21c may be provided on the core 18 as an extension of winding 21 and connected in series with a condenser 36 preferably having a high resistance 37 connected thereacross. The condenser 36 and winding portion 21c provide for a power factor correction of the ballast. Between filament leads 30b and 31b a radio interference elimination condenser 38 may be provided. The ballast core and the associated windings, the condenser 36, the resistor 37 and condenser 38 and the leads 32 and 33 are all enclosed in a ballast casing indicated by the broken line. The lead 39, which connects the booster transformer 13a with the lead 30a to cathode 15, is preferably connected to the lead 30a and the condenser 36 within the casing. Thus the leads to the casing containing the ballast are the lines 28 and 29, the line 39 and the filament lines 30a, 30b and 31a, 31b.

In Figs. 7, 8, 9, 10 and 11, another embodiment of the invention is shown. In this embodiment, the reactor winding and the transformer winding are divided into two separate portions. The transformer core and the reactor core are both of the rectangular type with the windings on opposite or parallel legs of the core.

The reactor portion comprises interleaved L-shaped laminations 74, 75 forming end legs 77, 78 and side legs 79, 80. As best illustrated in Fig. 9, the laminations 74, 75 extend the length of a side leg and a portion of an end leg and are interleaved so that the laminations overlap and are in metal-to-metal contact, and are in surface contact with adjacent laminations. Thus the laminations 74, 75 form a continuous magnetic path through the legs 77, 78, 79 and 80. The winding 20 is formed in two sections, 71 and 72, with central bores through each section. The laminations are stacked in the respective sections 71, 72 by alternately inserting the laminations 74, 75 in winding portion 20a and in winding portion 20b. The ends of the laminations overlap as previously described and clamping means are provided such as nonmagnetic bolts 81 and nuts 82.

The transformer portion comprises U-shaped laminations 83 and an I-lamination 84 preferably positioned between the ends of the U-shaped laminations 83 to form side legs 85, 86 and end legs 87, 88. The U-shaped laminations are stacked to form side legs 85, 86 and leg 87. The I-laminations 84 are slightly shorter than the length of the space between the end legs. The laminations 84 are stacked and positioned between the ends of the side legs 85, 86 and spaced therefrom to form monmagnetic gaps 89, 90 in the magnetic path formed by the legs 85, 86, 87 and 88. The laminations are large and form a high flux capacity for the flux created by the windings thereon.

The transformer winding and filament windings are formed in two sections, 91 and 92, with a central bore in each section. The side legs 85 and 86 are inserted in a respective winding. The stacked laminations 84 are preferably held in position by nonmagnetic straps 93a, 93b and 94a, 94b. Clamping means, such as nonmagnetic bolts 94 and nuts 96, extend through the corners of the transformer core to hold the laminations firmly together and clamping means such as bolt 95 and nuts 96 secure the laminations 84 to the straps 93a, 93b and 94a, 94b to form the nonmagnetic gaps. Instead of two gaps, one gap may be provided.

The peaking core is formed in two portions with connecting legs 100a, 100b and 101a, 101b, and end legs 102a, 102b and 103a, 103b, Figs. 7, 10 and 11. The peaking core is preferably formed by interleaved L-shaped laminations. The interconnecting legs 100a, 100b and 101a, 101b extend through the sections 91 and 71, and 92 and 72 of the transformer winding and reactor winding, respectively, to provide a magnetic path of low-flux capacity through the transformer winding and reactor winding. The interconnecting legs 100a, 100b and 101a, 101b and end legs 102a, 102b and 103a, 103b are magnetically isolated from the reactor core. This is preferably accomplished by nonmagnetic frames 104, 105 positioned between the aforementioned legs and the core of the reactor portion. Frame 104 and 105 may be formed from L-shaped members as illustrated in Fig. 12 of the drawings. These L-shaped members comprise nonmagnetic straps 106a and 106b on opposite sides of the leg 77 and nonmagnetic straps 107a and 107b extending along leg 78, intercoupling legs 79 and 80. Nonmagnetic pieces 108a, 108b extend along leg 79 between the interconnecting legs 100a, 100b and through the section 71 of the reactor winding and nonmagnetic pieces 109a, 109b extend between the leg 80 and the interconnecting legs 101a, 101b. The clamping means extend through the straps 106a, 106b and 107a, 107b and the interconnecting legs 100a, 100b and 101a, 101b and the reactor core to securely hold the straps and laminations together to form a unitary structure.

The transformer winding is formed in the sections 91 and 92 which are wound on the side legs 85 and 86, respectively, to provide a flux through the transformer core and the peaking core. The peaking core has a lower reluctance than the transformer core at the initial portion of the flux cycle. The initial flux then passes through the peaking core creating a voltage in the reactor winding. The low flux capacity of the peaking core causes it to saturate immediately. The flux density remains constant, and the peaking voltage drops. The flux from the transformer windings then passes through leg 88.

The advantage of this embodiment is that the overall size of the ballast is reduced and the ballast has a symmetrical shape. Thus the ballast of this embodiment may be placed in fixtures that could not accommodate the preferred embodiment. The filament windings 22, 23 and the booster winding and the additional winding for power factor correction may be wound in a suitable and conventional fashion on the legs 83 and 85.

In Figs. 13 through 15 a fluorescent ballast is illustrated for dimming two fluorescent lamps. This ballast may be similar to the preferred ballast and has an additional peaking core 110 and an additional reactor core 111. The paths of the ballast corresponding to the single lamp ballast have similar reference numerals and are similarly referred to. The peaking core 110 is identical with the peaking core 19 and the two paths 110a and 110b fit between the sections 18a, 18b and 18c of the transformer core in the spaces provided. The wattage of the transformer winding 21 is higher in order to provide energy for the additional filament winding 112 and additional flux for the peaking core 110. The reactor core 111 is preferably identical to the reactor core 17 and the winding 113 is identical to the winding 20. The laminations of the peaking core 110 and reactor core 111 are identical to the corresponding peaking core 19 and reactor core 17.

The Fig. 14 shows the winding 21 connected by leads 28 and 29 to the terminals 11 and 12 which may be in turn connected to any suitable 120 alternating voltage supply. The terminal 12 is preferably neutral or grounded, and the autotransformer 13 is connected across the terminals 11 and 12. The voltage may be increased in a similar manner as the single lamp ballast by means of the booster transformer 13a and the contact 13b being connected at an intermediate point thereto. The lamp 10 is connected in series with the reactor winding 20 and the lamp 114 is connected in series with reactor winding 120. The series combination of the winding 20 and the lamp 10 and the series combination of the winding 120 and the lamp 114 are connected in parallel between the end of the winding portion 21b and the ungrounded end of the booster transformer 13a. The filaments 15 and 115 are connected in parallel to the filament winding 112 and the filaments 16 and 116 are connected to the filament windings 22 and 23, respectively. The booster transformer 13a is connected by means of a line 39 to the filaments 15 and 115. The filament 16 is connected to the reactor winding 20 by means of lead 33 and the filament line 31a. The filament 116 is connected to the reactor 120 by means of line 117 and the filament line 30b. The other ends of the reactor winding 20 and reactor winding 120 are connected to the end of the winding portion 21b by means of lines 32 and 118, respectively.

Thus the arc current supplied to the lamps through the lead 39 to the cathodes 15 and 115 passes through the lamps 10 and 114, respectively, and thus by line 33 and 117 to the reactor windings 20 and 120, respectively, and through the lines 32 and 118 to the winding portion 21b. The voltage across the reactor windings is determined by the voltage across the booster transformer 13a and the winding portion 21b. As in the single lamp ballast, a winding 21c and a condenser 36 are provided in series to correct the power factor of the ballast.

In the various cores shown and described, each lamination may comprise several layers of thin steel or may comprise single layers of steel. Thus, in forming the reactor core 20, several layers of steel may be stacked contiguously and coextensively to form each lamination. These laminations may be then interleaved to form the reactor core.

As shown in Fig. 14, the lamps 10 and 114 are connected in series with reactor windings 20 and 120, respectively. The series combination of lamps and windings are connected in parallel between the variable tap 13b and the end of the booster turns 21b.

The main winding 21 is connected across the terminals. Thus the series parallel combustion is connected to terminal 11. The lamps are connected to fire simultaneously since the voltages supplied to the two series parallel combustion are in phase.

In Fig. 14 a winding 21c and condenser 98 are connected in series across the main winding to provide for a connection of the power factor of the ballast. This winding 21c is wound on the center leg of the transformer core 18 with the main winding 21 and the filament windings 23, 22 and the third filament winding 112.

Various modifications and changes may be made in the ballast without departing from the scope of the invention as set forth in the appended claims.

I claim:

1. In a ballast for varying the intensity of illumination of a gaseous discharge lamp and having a first laminated ferromagnetic core forming a closed flux path having a high permeability and a low flux capacity, a second ferromagnetic core forming a closed flux path having a higher flux capacity and a higher reluctance than the flux path of said first core, a winding magnetically coupled to said cores to supply flux thereto and saturating said first core and passing flux to said second core, a second winding coupled to said first core for creating a peaking voltage in said winding by the change of flux in said first core and a third core coupled to said second winding to create an impedance in said second winding, nonmagnetic means between said first and second cores to space said third core and said first core to form separate flux paths, the combination of laminations in said third core having a nonmagnetic contouring over a short portion of the flux path of the third core to produce a gradual saturation of the third core and a gradual increase in the impedance of the second winding as the current through the winding increases.

2. In a ballast for varying the intensity of illumination of a gaseous discharge lamp and having a first laminated ferromagnetic core forming a closed flux path having a high permeability and a low flux capacity, a second ferromagnetic core forming a closed flux path having a higher flux capacity and a higher reluctance than the flux path of said first core, a winding magnetically coupled to said cores to supply flux thereto and saturating said first core and passing flux to said second core, a second winding coupled to said first core for creating a peaking voltage in said winding by the change of flux in said first core and a third core coupled to said second winding to create an impedance in said second winding, nonmagnetic means between said first and second cores to space said third core and said first core to form separate flux paths, the combination of laminations in said third core having apertures to reduce the magnetic cross section of said third core to produce a saturation of the core adjacent to said apertures and thereby produce a gradual decrease in the impedance of the second winding as the current passing through the winding increases.

3. In a ballast for varying the intensity of illumination of a gaseous discharge lamp and having a first laminated ferromagnetic core forming a closed flux path having a high permeability and a low flux capacity, a second ferromagnetic core forming a closed flux path having a higher flux capacity and a higher reluctance than the flux path of said first core, a winding magnetically coupled to said cores to supply flux thereto and saturating said first core and passing flux to said second core, a second winding coupled to said first core for creating a peaking voltage in said winding by the change of flux in said first core and a third core coupled to said second winding to create an impedance in said second winding, nonmagnetic means between said first and second cores to space said third core and said first core to form separate flux paths, the combination of laminations in said third core having apertures forming nonmagnetic spaces, said apertures being offset so that the nonmagnetic spaces are positioned between and coextensive with the magnetic portions of adjacent laminations to gradually saturate the core as the current increases and gradually decrease the impedance of the second winding.

4. In a ballast for varying the intensity of illumination of a gaseous discharge lamp and having a first laminated ferromagnetic core forming a closed flux path having a high permeability and a low flux capacity, a second ferromagnetic core forming a closed flux path having a higher flux capacity and a higher reluctance than the flux path of said first core, a winding magnetically coupled to said cores to supply flux thereto and saturating said first core and passing flux to said second core, a second winding coupled to said first core for creating a peaking voltage in said winding by the change of flux in said first core and a third core coupled to said second winding to create an impedance in said second winding, nonmagnetic means between said first and second cores to space said third core and said first core to form separate flux paths, the combination of laminations in said third core for carrying flux created by said second winding and each lamination having an aperture forming a nonmagnetic portion in said lamination to reduce the high permeability area of said lamination over a portion of the length of the flux path, said laminations being stacked with the nonmagnetic portions having magnetic laminations positioned on each side of said apertured portion to provide a path for the flux and the laminations over the apertured length of the flux path gradually saturating to gradually reduce the impedance of the winding as the current through the winding increases.

5. In a ballast for varying the intensity of illumination of a gaseous discharge lamp and having a first laminated ferromagnetic core forming a closed flux path having a high permeability and a low flux capacity, a second ferromagnetic core forming a closed flux path having a higher flux capacity and a higher reluctance than the flux path of said first core, a winding magnetically coupled to said cores to supply flux thereto and saturating said first core and passing flux to said second core, a second winding coupled to said first core for creating a peaking voltage in said winding by the change of flux in said first core and a third core coupled to said second winding to create an impedance in said second winding, nonmagnetic means between said first and second cores to space said third core and said first core to form separate flux paths, the combination of laminations in said third core having apertures in consecutive laminations with the apertures offset so that adjacent laminations position the adjacent apertures in a partial overlapping relation with a lamination positioned between apertures of adjacent laminations to reduce the flux capacity of the core and to produce a gradual saturation of the core and a gradual increase of impedance of the second winding as the current increases.

6. A reactive device comprising a ferromagnetic core and a winding on said core for passing alternating current over a wide range, said core forming a closed flux path and formed from ferromagnetic laminations, each of said laminations having apertures extending over a short portion of the length of the flux path, said apertures forming nonmagnetic portions in said laminations and reducing the cross sectional area of the ferromagnetic laminations, apertures of adjacent laminations offset in relation to one another to position the ferromagnetic portion of the adjacent lamination alongside of at least a portion of an aperture to provide a gradual saturation of the core and a gradual reduction of the impedance of the winding as the current through the winding increases.

References Cited in the file of this patent

UNITED STATES PATENTS

| Number | Name | Date |
| --- | --- | --- |
| 2,009,787 | Rypinski | July 30, 1935 |
| 2,157,834 | Schmidt | May 9, 1939 |
| 2,465,596 | Landis | Mar. 29, 1949 |
| 2,470,460 | Bird | May 17, 1949 |
| 2,665,406 | Carmichael | Jan. 5, 1954 |

FOREIGN PATENTS

| Number | Country | Date |
| --- | --- | --- |
| 42,343 | France (1st ad. to 733,427) | July 11, 1933 |